United States Patent Office 3,257,250
Patented June 21, 1966

3,257,250
ACETYLENIC EPOXY AMINO COMPOUNDS AND
METHOD OF MAKING THE SAME
Donald D. Perry, Morristown, and Murray S. Cohen, Convent Station, N.J., assignors to Thiokol Chemical Corporation, Bristol, Pa., a corporation of Delaware
No Drawing. Filed June 6, 1963, Ser. No. 285,899
7 Claims. (Cl. 149—109)

This application is a continuation-in-part of application Serial No. 1,155, filed January 5, 1960, now abandoned.

This invention relates to acetylenic epoxy amino compounds, to fuel mixtures comprising these compounds, and to methods of making the same.

The compounds are prepared by reaction of an acetylenic amine with an epichlorohydrin to form chlorohydrins, which are then dehydrohalogenated to form epoxy compounds.

The resulting products, alone or in admixture with each other, are high energy liquid fuels particularly suitable for the propulsion of liquid fuel rockets. In such rockets, liquid fuels are commonly brought into contact with a liquid oxidizing agent such as nitric acid, liquid oxygen, or hydrogen peroxide, to produce gaseous reaction products for propelling the rocket. Details of such liquid fuel rockets are to be found in the literature, for example in Rocket Propellants by Francis A. Warren, published by Reinhold Publishing Corporation (1958).

The methods and products of the present invention are described below. The reaction involves the condensation of an acetylenic amine, either primary or secondary, with epichlorohydrin: e.g.

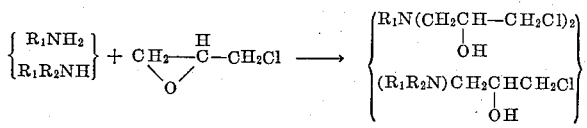

where $R_1$ and $R_2$ are the same or different acetylenically unsaturated aliphatic radicals, advantageously alkynyl (triply unsaturated hydrocarbon) radicals.

Both the acetylenic amino compounds and the epichlorohydrins are obtainable by methods known in the art. For example, the amines can be prepared by reaction of the corresponding acetylenic halides with excess ammonia. Epichlorohydrin is derivable from 1,3-dichloro-2-hydroxypropane.

The amines may be separately isolated from the acetylenic halide-ammonia reaction mixture before further reaction with epichlorohydrin, or the reaction mixture can be reacted with epichlorohydrin in bulk or in the presence of a solvent inert to the reaction, such as ether. The reaction between epichlorohydrin and the amines is conveniently carried out by heating the reagents at temperatures of from about 25° C. to about 80° C. until the reaction is substantially complete (generally from one to four hours). If desired, part or all of any solvent possibly present can be removed and the reaction mixture further heated at 45°–60° C. for an additional period of 4 to 8 hours.

The chlorohydrins formed in this reaction are cyclized to epoxy amines by treatment with a stoichiometric excess of a base, preferably a concentrated aqueous solution (40–50%) of an alkali metal hydroxide or alkaline earth hydroxide, such as LiOH, NaOH, KOH, $Ca(OH)_2$, $Ba(OH)_2$, etc. The reaction is conveniently carried out adding the base to the chlorohydrins, maintaining a temperature of about 20° C., stirring, and allowing the mixture to stand for 2–4 hours. The two phases of the mixture are separated, and the organic layer is then suitably washed and dried. Any solvent remaining can be removed by distillation, or vacuum distillation may be used to purify the product.

A better understanding of the invention and of its many advantages will be had by referring to the following specific examples, given by way of illustration.

Example 1

A mixture of mono-, di-, and tripropargylamine was prepared by reacting propargyl bromide, $HC{\equiv}C{-}CH_2Br$, with an excess of ammonia. (Alternatively, propargyl chloride has been used as a reactant.) In the synthesis, propargyl bromide is gradually added, over a period of 3 hours and with vigorous agitation, to liquid ammonia, keeping the temperature below the boiling point. The reaction mixture is then agitated for an additional 30 minutes. A volume of ether approximately equal to the original volume of liquid ammonia employed is then slowly added. The mixture is left to warm to room temperature and the residual ammonia is allowed to evaporate. (If necessary, gentle warming can be used to expel the last traces of ammonia.) Simultaneously, ammonium bromide precipitates. The solid is filtered out, leaving an ethereal solution of mixed mono-, di-, and tripropargylamines which is separated by distillation into amine components, propargylamine, dipropargylamine, and tripropargylamine.

By increasing the ratio of liquid ammonia to acetylenic halide, the formation of primary amines is favored. By decreasing the ratio of ammonia to halide, the formation of tertiary amine products is favored. In most cases, a secondary amine is the predominant product in the amine mixtures produced.

The isolated propargylamine fraction was reacted with two molar equivalents of epichlorohydrin at 30°–45° C. for 1 to 4 hours to form bis(2-hydroxy-3-chloropropyl) propargylamine. The amine was treated with an excess of concentrated NaOH at 20° C. to effect closure of the epoxide ring. Propargyldiglycidylamine (PRODGA) was obtained in a yield up to 90%. The material had an index of refraction $n_D{^{25}}=1.4801$.

Calculated for $C_9H_{13}NO_2$(percent): C, 64.65; H, 7.83. Found: C, 64.57; H, 7.88.

The isolated dipropargylamine fraction was reacted with one molar equivalent of epichlorohydrin at 40°–80° C. for 1 to 4 hours, either in bulk or in a solvent, to form dipropargyl-2-hydroxy-3-chloropropylamine. This intermediate was treated, without isolation, with an excess of concentrated alkali at about 20° C., with the production of dipropargylglycidylamine (DIPGA) in yields of from 50–80%. The material had an index of refraction $n_D{^{25}}=1.4828$.

Calculated for $C_9H_{11}NO$(percent): C, 72.45; H, 7.43; N, 9.39. Found: C, 72.67; H, 7.60; N, 8.84.

The ballistic properties of propargyldiglycidylamine (PRODGA), dipropargylglycidylamine (DIPGA), and tripropargylamine (TRIPRAM) are reported below.

| Compound | Density, gm./cc. (25° C.) | Specific Impulse with $HNO_3$ (600 p.s.i.a.) | Density Impulse (gm.-sec./ cm.³) | Oxidizer to Fuel Ratio |
|---|---|---|---|---|
| PRODGA | 1.059 | 245.7 | 336.1 | 2.6 |
| DIPGA | 0.993 | 247.5 | 333.0 | 2.7 |
| TRIPRAM | 0.921 | 250.0 | 330.6 | 3.2 |

Example 2

A mixed glycidylamine fuel containing PRODGA, DIPGA, and TRIPRAM can be prepared by adding the propargyl halide-ammonia reaction product of Example 1 directly to a quantity of epichlorohydrin sufficient to react with the primary and secondary amines present and heating the mixture at 25°–50° C. for several (48) hours. Further reaction at 45°–60° C. for another 4 to 8 hours may be effected to assure a high conversion, with intermediate removal of any solvents possibly optionally added initially.

The resulting product is then treated with concentrated aqueous alkali, with stirring and cooling to 20° C. After 2 to 4 hours, the inorganic and organic layers are separated, the organic layer is washed once with 40–50% NaOH, and dried over sodium sulfate. Any remaining solvent such as ether can be removed by gentle warming at reduced pressures. The remaining mixed fuel is quite pure, but can be further purified by vacuum distillation, if necessary.

Although specific embodiments have been shown and described herein, it will be understood that they are illustrative and not limiting on the scope and spirit of the invention.

What is claimed is:
1. An acetylenic epoxy amino compound of the formula

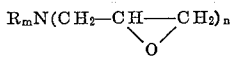

where R is propargyl, $m$ and $n$ are integers between one and two inclusive, and the sum of $m$ and $n$ is three.
2. Propargyldiglycidylamine.
3. Dipropargylglycidylamine.
4. An acetylenic epoxy amino mixture consisting of

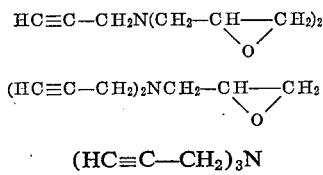

$(HC{\equiv}C{-}CH_2)_3N$

5. The method of making an acetylenic epoxy amine which comprises reacting epichlorohydrin and a member selected from the group consisting of propargyl amine and dipropargyl amine to form an acetylenic chlorohydrin reaction product, and then dehydrohalogenating said reaction product with a base selected from the group consisting of alkali metal and alkaline earth metal hydroxides to form an acetylenic epoxy amine.

6. The method of making an acetylenic epoxy amine which comprises heating a mixture of epichlorohydrin and an acetylenic amine selected from the group consisting of $R_1NH_2$ and $R_1R_2NH$ where $R_1$ and $R_2$ are propargyl, and then dehydrohalogenating chlorohydrins in the resultant product by adding a base thereto, said base being a member selected from the group consisting of alkali metal and alkaline earth metal hydroxides.

7. The method of making an acetylenic epoxy amine mixture which comprises reacting propargyl halide with liquid ammonia to form a mixture of primary, secondary and tertiary propargyl amines, heating said amine mixture with epichlorohydrin, and dehydrohalogenating chlorohydrins in the reaction product by addition thereto of a base selected from the group consisting of alkali metal and alkaline earth metal hydroxides.

References Cited by the Examiner
UNITED STATES PATENTS 1,790,042 1/1931 Eisleb _____ 260—348
2,766,285 10/1956 Hennion.
2,901,886 9/1959 Doerner _____ 260—583

FOREIGN PATENTS 675,665 7/1950 Great Britain.

OTHER REFERENCES

Paquin, A. M.: Epoxydverbindungen und Epoxydharze (1958), pp. 4, 182–188, TP986 E6P3.
Banik, E.: Chem. Abstracts, vol. 50 (1956), p. 14229.

LEON D. ROSDOL, *Primary Examiner.*

NICHOLAS S. RIZZO, CARL D. QUARFORTH,
*Examiners.*

N. S. MILESTONE, L. A. SEBASTIAN,
*Assistant Examiners.*